United States Patent [19]

Mohlenkamp et al.

[11] Patent Number: 5,423,580

[45] Date of Patent: Jun. 13, 1995

[54] FLUID COUPLING WITH GASKET RETAINER

[75] Inventors: Michael J. Mohlenkamp, University Heights; Gerald A. Babuder, Mentor, both of Ohio

[73] Assignee: Cajon Company, Macedonia, Ohio

[21] Appl. No.: 187,096

[22] Filed: Jan. 26, 1994

[51] Int. Cl.6 .............................................. F16L 19/03
[52] U.S. Cl. ................... 285/379; 285/328; 285/917; 277/189; 277/236; 277/11
[58] Field of Search ............... 285/379, 380, 328, 917; 277/189, 236, 915, 10, 11

[56] References Cited

U.S. PATENT DOCUMENTS

| | | |
|---|---|---|
| 848,549 | 3/1907 | Hawley et al. . |
| 923,112 | 5/1909 | Brodie . |
| 1,731,404 | 10/1929 | Wetnerill ............................ 277/11 |
| 2,307,440 | 1/1943 | Wilson . |
| 2,646,997 | 7/1953 | Magos et al. . |
| 3,262,722 | 7/1966 | Gastineau et al. .................... 277/11 |
| 3,721,452 | 3/1973 | Black . |
| 3,874,675 | 4/1974 | Belter et al. . |
| 3,909,011 | 9/1975 | Sheesley . |
| 3,957,275 | 5/1976 | Belter et al. . |
| 4,155,571 | 5/1979 | Gastineau et al. . |
| 4,552,389 | 11/1985 | Babuder et al. ..................... 285/379 |
| 4,650,227 | 3/1987 | Babuder et al. ..................... 285/379 |

FOREIGN PATENT DOCUMENTS

| | | |
|---|---|---|
| 514793 | 11/1992 | European Pat. Off. ............ 285/379 |
| 1775199 | 7/1971 | Germany . |
| 2738244 | 3/1979 | Germany . |
| 6147174 | 3/1988 | Japan .................................. 285/379 |

*Primary Examiner*—Eric K. Nicholson
*Attorney, Agent, or Firm*—Fay, Sharpe, Beall, Fagan, Minnich & McKee

[57] ABSTRACT

A gasket and retainer assembly for a tube coupling arranged such that the gasket can be installed into, and removed from, a retained and supported position between the coupling components with a strictly lateral movement. The assembly includes a retainer having a pair of engagement portions located on generally diametrically opposite sides of the gasket to radially grip the associated coupling component.

6 Claims, 3 Drawing Sheets

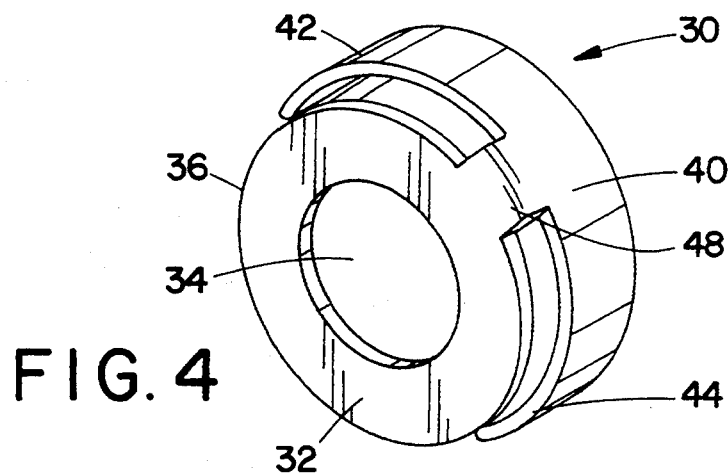
FIG. 4
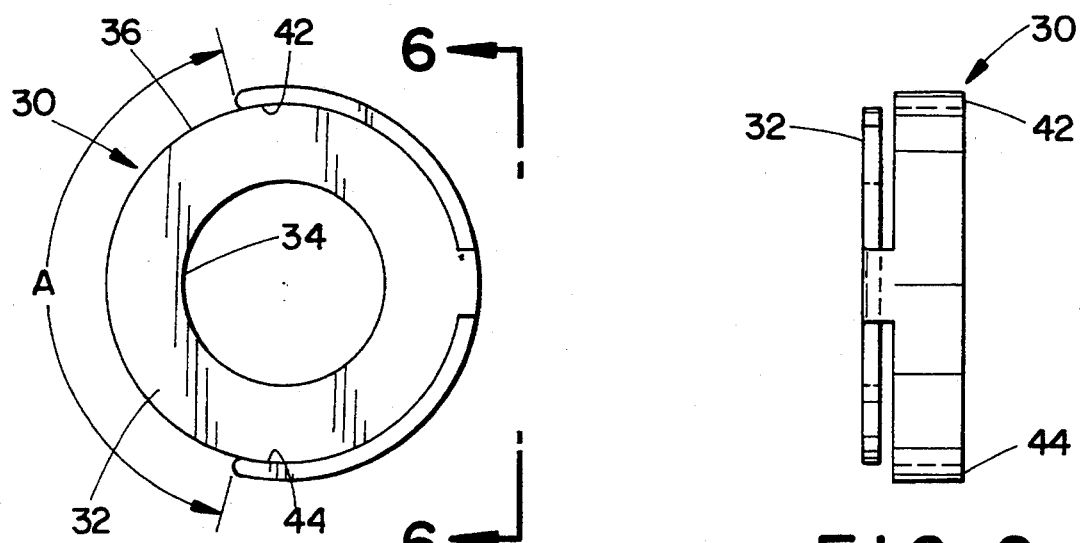
FIG. 5
FIG. 6
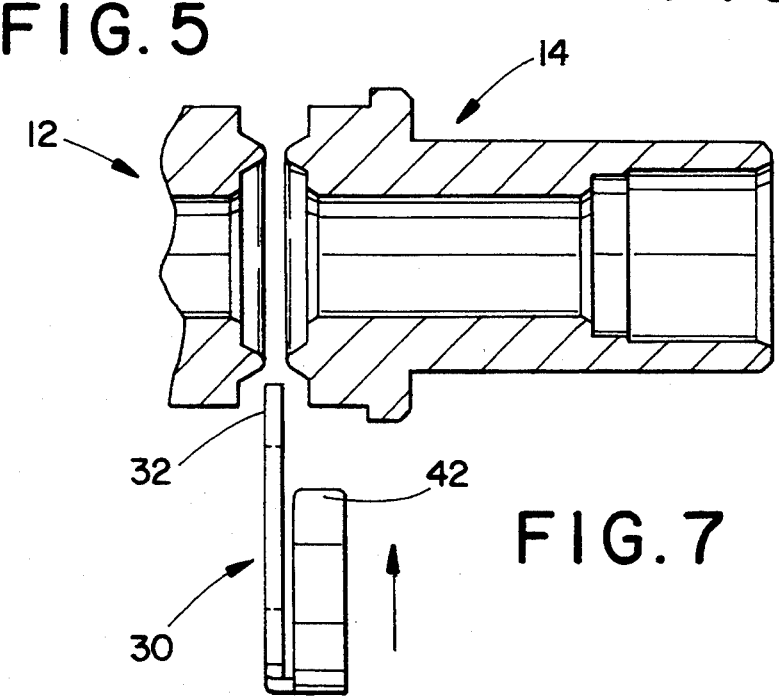
FIG. 7

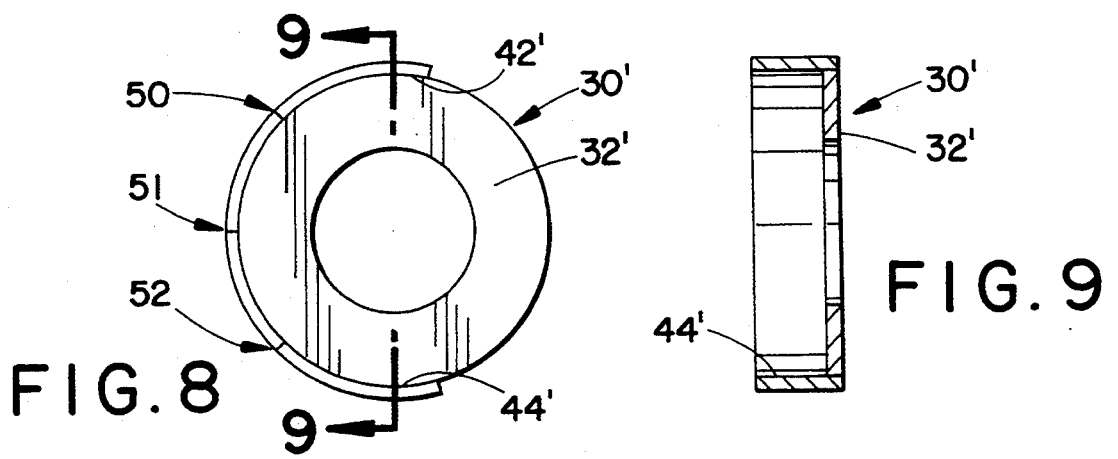
FIG. 8
FIG. 9
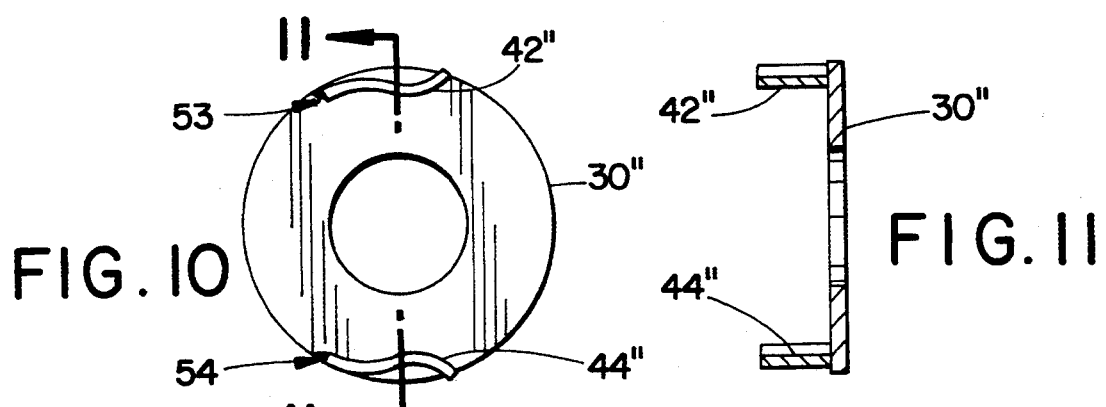
FIG. 10
FIG. 11
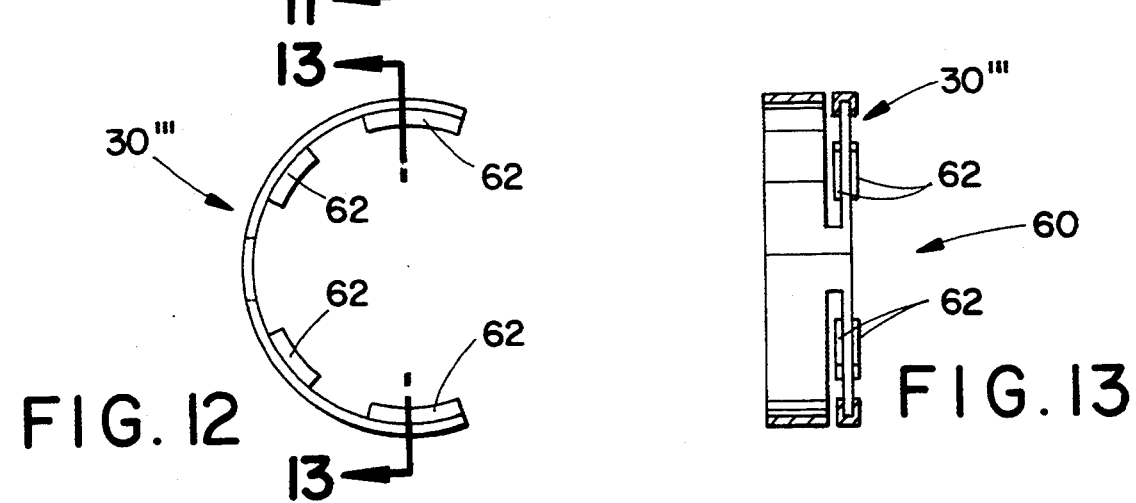
FIG. 12
FIG. 13
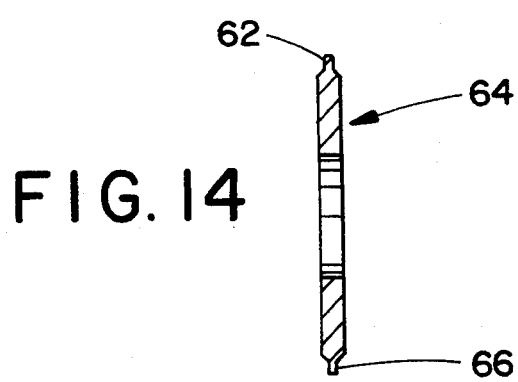
FIG. 14

FLUID COUPLING WITH GASKET RETAINER

BACKGROUND OF THE INVENTION

The subject invention is directed toward the art of fluid couplings and, more particularly, to a coupling of the face sealing type which incorporates an improved arrangement for supporting a sealing gasket between the opposed sealing faces.

In the prior commonly assigned U.S. Pat. Nos. 4,552,389, 4,650,227, and 4,838,583, there are disclosed fluid couplings which include retainer arrangements for positioning and locating a gasket between the opposed seal faces of a fluid system device or coupling component. In the retainer arrangements of these prior patents, the coupling components must be disconnected and axially separated before the gasket and the associated retainer can be removed and replaced. Thus, generally, in order to allow replacement of gaskets, the pipe or tubing system had to be designed to permit axial separation of the coupling components such as through the use of additional fittings and removable sections.

SUMMARY OF THE INVENTION

The subject invention overcomes the noted problems and provides a coupling arrangement wherein the gaskets can be inserted and removed with a strictly radial movement. The sealing face surfaces thus need to be moved axially only by an amount sufficient to achieve disengagement from the gasket to allow gasket removal and replacement. It is thus possible to perform maintenance, component replacement, and the like with a minimum of system disassembly.

In accordance with the subject invention, a face seal tube coupling of the type including first and second coupling components with cylindrical end portions located in axial alignment and carrying opposed circular end faces having sealing protrusions extending axially therefrom and including means for moving the end faces into sealing engagement with a circular flat metal gasket positioned between them is provided with an improved gasket retainer for maintaining the gasket in aligned relationship with the end faces. The gasket retainer includes at least a pair of generally diametrically opposed and axially extending support portions located at the outer periphery of the gasket. The pair of support portions are resilient and are biased radially inward generally toward one another to engage the cylindrical end portion of one of the coupling components with a radial inward gripping force substantially at diametrically opposed positions. The gasket retainer is entirely open along one lateral side between the support portions to thereby allow the gasket retainer and the gasket to be moved radially into position on the one of the coupling components to permit installation and removal of the gasket retainer and the associated gasket while the coupling components are in axial alignment with their sealing beads spaced from one another only a distance equal to the thickness of the gasket.

Because of the noted design, it is possible to install and remove the gasket while the coupling components are substantially in their final located position. That is, it is necessary to separate the coupling components only an amount sufficient to cause disengagement of their sealing faces from the gasket face. The gaskets can thus be installed and removed while the major components of the piping or tubing system are in their final located position. It is not necessary to provide special removable components or pieces of the system to allow gasket replacement to take place.

In accordance with a still further aspect of the invention, the gasket retainer can be formed integrally with the gasket. Alternatively, it is possible for the gasket retainer to be one or more separate components which are clipped to or mechanically joined with the gasket.

In accordance with a still further object of the invention, the gasket retainer in its preferred form has a generally C-shaped body and the retaining portions are defined by the ends of the C-shaped body. In addition, it is preferable that the C-shaped body be joined to the gasket at a point generally mid-way between the ends of the C-shaped body so that the end portions can be resiliently flexible radially relative to the gasket and the point of connection.

In accordance with another aspect of the invention, the gasket retainer can comprise a pair of generally diametrically opposed leg portions which are separately joined at opposite sides of the gasket and define the engagement portions.

As can be seen from the foregoing, a primary object of the invention is the provision of a gasket and gasket retainer assembly for use in face seal type coupling assemblies.

Yet another object of the invention is the provision of a gasket and gasket retainer assembly of the general type described wherein removal and replacement of the gaskets can take place while the coupling components are in aligned relationship and the seal faces spaced a distance only slightly greater than the thickness of the gasket so that gasket installation and removal can take place by lateral movement of the gasket into its located position.

A still further object of the invention is the provision of a gasket retainer assembly of the general type described which can be either an integral portion of the gasket or a separate element or elements which are mechanically joined to the gasket.

BRIEF DESCRIPTION OF THE DRAWINGS

The above and other objects and advantages will become apparent from the following description when read in conjunction with the accompanying drawings wherein:

FIG. 4 is an isometric view of the preferred form of gasket and retainer assembly as used in the FIGS. 1 through 3 embodiment;

FIG. 5 is a left-end view of the gasket and retainer assembly shown in FIG. 4;

FIG. 6 is a side view of the gasket retainer of FIG. 5 (the view is taken on line 6—6 of FIG. 5);

FIG. 7 is a partial cross-sectional view through a coupling assembly of the type shown in FIG. 1 with the female coupling nut ring removed and showing the manner of installing the gasket and retainer assembly;

FIG. 8 is an elevational view of a second embodiment of gasket and retainer assembly;

FIG. 9 is a cross-sectional view of the gasket and retainer assembly of FIG. 8 (the view is taken on line 9—9 of FIG. 8);

FIG. 10 is an elevational view of a third gasket and retainer assembly embodiment;

FIG. 11 is a cross-sectional view of the embodiment of FIG. 10 (the view is taken on line 11—11 of FIG. 10);

FIG. 12 is an elevational view of a gasket retainer in accordance with a fourth embodiment of the invention;

FIG. 13 is a cross-sectional view taken on line 13—13 of FIG. 12; and,

FIG. 14 is a cross-sectional view through a gasket member for use in the FIGS. 12 and 13 embodiment.

DETAILED DESCRIPTION OF THE PREFERRED AND ALTERNATE EMBODIMENTS

Figure 1:
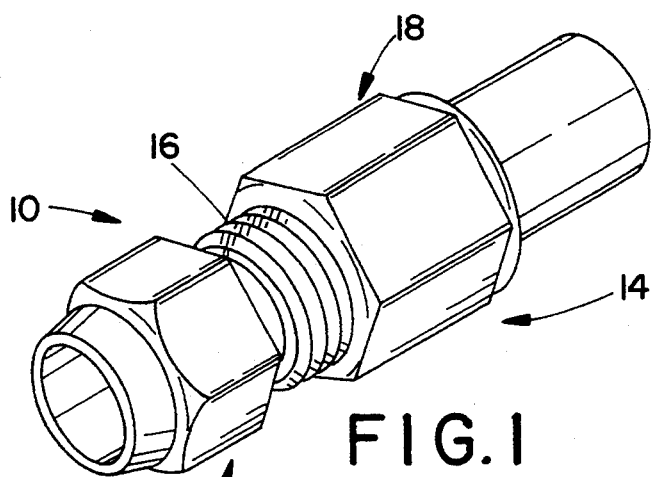
FIG. 1 is an isometric view showing a coupling assembly of the general type under consideration and incorporating a gasket and retainer assembly formed in accordance with the invention.
Figure 2:
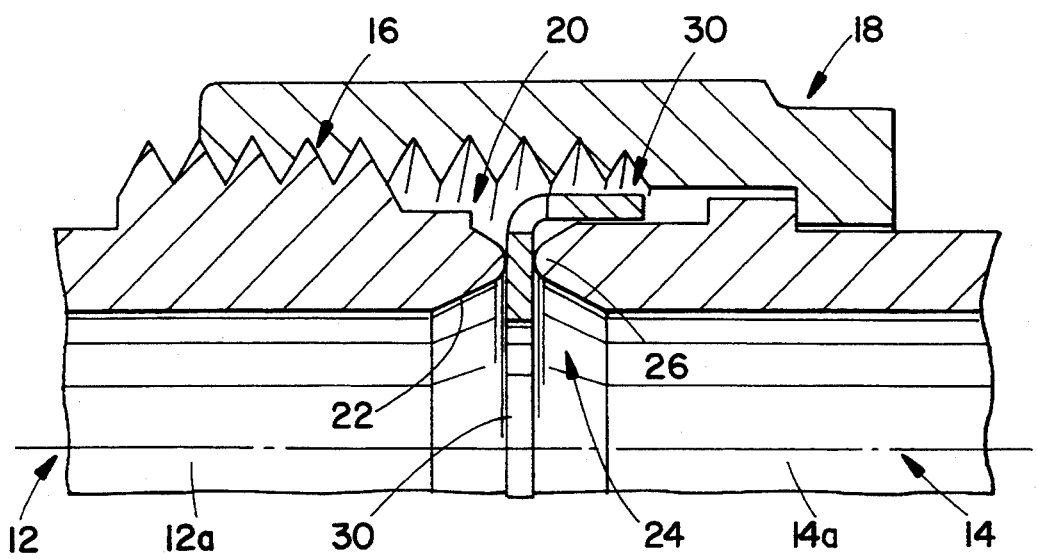
FIG. 2 is a partial cross-sectional view of the coupling assembly of FIG. 1.

Referring more particularly to the drawings wherein the showings for the purpose of illustrating preferred and alternate embodiments only, and not for the purpose of limiting same, FIG. 1 shows a face seal type fitting often used in vacuum and high pressure systems and generally comprising a first coupling component 12 and a second coupling component 14 joined by threaded clamping means including threaded male portion 16 formed on coupling component 12 and a female nut member 18 which receives coupling component 14 and threadedly engages the male threaded portion 16 of coupling component 12. As can be seen in FIG. 2, in the subject embodiment, the coupling component 12 includes a sealing face or end 20 which has a circumferentially extending sealing protuberance 22 shown in the form of a bead. It should be appreciated, however, that it is within the scope of the subject invention to have a variety of different forms of sealing face protuberances carried on the face 20.

The second coupling component 14 likewise includes a sealing end face 24 which is also provided with an outwardly extending sealing protuberance 26 that is also shown in the form of a smoothly curved bead element. In this embodiment, the two coupling components 12 and 14 each include a central through passage 12a and 14a, respectively. It should be understood, however, that one or the other of the coupling components could be a blind element such as is used for full line closures or plugs. Likewise, although the invention is described with reference to a fluid connection coupling, the individual seal faces could be formed integrally with various types of flow system devices such as valves, filter elements, and the like.

Figure 3:
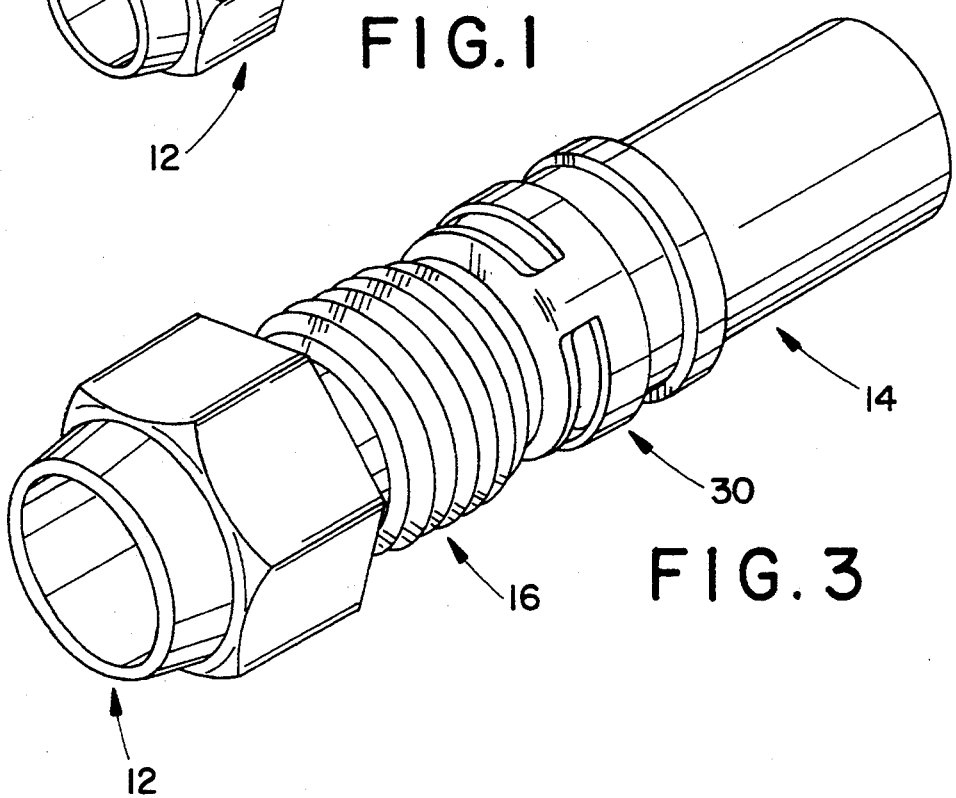
FIG. 3 is an enlarged isometric view of the coupling assembly of FIG. 1 with the female coupling nut removed.

Referring again to FIGS. 2 and 3, the coupling assembly of the subject invention includes a gasket and retainer assembly 30 which is positioned between the mating aligned coupling components 12, 14. As best illustrated in FIGS. 4 through 6, the assembly 30 has a flat metal annulus-like gasket portion 32 that includes a central opening 34 and a circular outer periphery 36. The gasket is sized to allow the sealing protuberances 22, 26 to engage on opposite sides of the gasket and penetrate slightly thereinto to produce a fluid seal when the coupling components 12 and 14 are driven axially toward one another and into engagement with the gasket 32.

In accordance with the subject invention, the gasket and retainer assembly 30 is arranged such that the gasket can be installed into, and removed from, a retained and supported position between the coupling components 12 and 14 with a strictly lateral movement of the gasket and retainer assembly. In this regard, the retainer includes a retainer portion 40 that has a pair of engagement portions 42 and 44 that are located on generally diametrically opposite sides of the gasket as illustrated in FIG. 5. The engagement portions 42, 44 are spaced apart a distance generally corresponding to the diameter of the circular end portion of the coupling component to which they are to be connected. In this embodiment, and as illustrated in FIG. 2, they engage about the circular end of coupling component 14 to locate the gasket 30. Each of the engagement portions 42 and 44 have an arcuate inner face which corresponds to the curvature of the end face of coupling component 14. Additionally, the engagement portions are arranged so as to have a bias toward one another and, in their normal non-installed position, have a distance between them which is less than the diameter of the end portion of coupling component 14. Additionally, as can be seen in FIG. 5, the gasket and retainer assembly is laterally open throughout the arcuate portion A as illustrated in FIG. 5. This lateral open extent is only slightly less than 180° of the gasket periphery.

As can be seen from the foregoing, the relationship between the engagement portions and the gasket 32 is such that the gasket can be moved laterally into position on the cylindrical end portion of the coupling component. This is illustrated in FIG. 7 wherein the gasket and retainer assembly 30 is illustrated moving laterally between the sealing end faces of the coupling components 12 and 14 while the coupling components are in axial aligned position with their sealing end faces spaced an amount only slightly greater than the thickness of the gasket portion 32 of the assembly 30. Thus, replacement of gasket members can take place with the coupling components nearly in their normal assembled position in the piping or tubing system. This is in direct contradistinction to the typical prior art assembly wherein the gaskets and their retainers are capable of being moved into position only through an axial loading movement which requires significantly greater spacing between the end faces. This generally necessitates disassembly of a portion of the piping system and/or the inclusion of separate additional components in the system to allow such separation.

There are many ways in which the contact surfaces 42, 44 can be provided and can have the biased relationship necessary for radially gripping the cylindrical end of the fitting components to maintain the gasket member in position. The FIGS. 4 through 6 gasket and retainer assembly has the retainer contact portions formed by the ends of a resilient C-shaped body element that is formed as an integral part of the gasket and joined thereto by an intermediate single web section 48. The C-shaped body is a flat resilient element having a curvature generally corresponding to the outer peripheral edge of gasket 32 which is, in turn, sized to the cylindrical end portion of the coupling component on which the assembly is to be mounted.

FIGS. 8 and 9 illustrate a slightly modified form for the gasket and retainer assembly. In this embodiment, the same elements are identified by the same numerals differentiated from the FIGS. 4 through 6 embodiment by the addition of a prime (') suffix. As shown therein, the C-shaped body which forms the retainer portion and defines the engagement portions 42' and 44' is formed as a separate element and is connected to the periphery of the gasket 32' by being spot welded at intermediate locations 50, 51, and 52. This allows the end portions of the C-shaped body, which form the contacts 42' and 44' to be somewhat flexible and resilient relative to the gasket 30' and allows them to flex diametrically toward and away from one another to provide a biased gripping force.

FIGS. 10 and 11 show a third embodiment which uses the same identifying numerals differentiated by a double prime (") suffix. In the embodiment, the contact portions 42" an 44" are formed by separate curved members shaped as shown and connected to the gasket 30" by, for example, a spot welding at locations 53 and 54, respectively. This also allows radial flexing and diametrically opposed gripping and biasing of the contact portions. It should be noted that in both the FIGS. 8–9 and the FIGS. 10–11 embodiments the arrangement is such that the retainer portion is open throughout nearly 180° of the periphery of the associated gasket.

FIGS. 12 through 14 are a fourth embodiment of the gasket and retainer assembly (the same numerals and triple prime ('") suffixes are used) wherein the C-shaped body of the retainer 30'" is formed and arranged as discussed with reference to the C-shaped body of the FIGS. 4–6 embodiment. However, extending from the C-shaped body is a gasket gripping portion 60 which is also provided as a C-shaped body but includes a series of closely spaced gripping elements 62 that engage the narrow peripheral edge of the gasket 64 illustrated in FIG. 14. That is, the gasket 64 of FIG. 14 includes an outwardly extending, narrow peened or machined portion 66 that can be slid between the narrow pairs of gripping elements 62 and retained therein during movement of the gasket and retainer assembly into mounted position on the coupling components.

The arrangement of the gasket retainer of the subject invention is such that original assembly of the components is facilitated. The radial movement for mounting the gasket and retainer permits simpler automation of the installation as compared with the axial movement required by the prior art arrangements.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a face seal tube coupling including first and second coupling components with cylindrical end portions located in axial alignment and carrying opposed circular end faces with sealing beads extending axially from each end face and a nut member for moving the end faces into sealing engagement with a circular flat metal gasket positioned between them, the improvement comprising:

a gasket retainer for maintaining the gasket in aligned relationship with the end faces, said gasket retainer including at least a pair of generally diametrically opposed axially extending support portions located at the outer periphery of the gasket, the pair of support portions being resilient and biased radially inward generally toward one another to engage the cylindrical end portion of one of the coupling components with a radial inward gripping force substantially at diametrically opposed positions, the gasket retainer being entirely open between the support portions along at least one lateral side of the gasket to allow the gasket retainer and the gasket to be moved radially into position on the said one of the coupling components to permit installation and removal of the gasket retainer and the gasket while the coupling components are in axial alignment with their sealing beads spaced from one another only a distance equal to the thickness of the gasket;

the gasket retainer being formed to have a generally C-shaped resilient body joined to the periphery of the gasket generally midway between the ends of the C-shaped body, the end portions of the C-shaped body forming said pair of generally diametrically opposed axially extending support portions.

2. The improvement as defined in claim 1 wherein the gasket retainer is provided with means for resiliently gripping the periphery of the gasket.

3. In a fluid coupling including first and second coupling components with cylindrical end portions carrying sealing end faces located in axial alignment and clamping means for moving the sealing end faces into sealing engagement with a flat circular metal gasket positioned therebetween, the improvement comprising:

a retainer means for positioning and holding the gasket in alignment with the sealing end faces and permitting lateral insertion and removal of the gasket and the retainer means while the end faces are spaced a distance substantially equal to the thickness of the gasket, the retainer means including a pair of engagement portions joined to the gasket and extending therefrom in a direction generally perpendicular to the sealing end faces at locations on diametrically opposite sides of the cylindrical end portion of the first coupling component, the engagement portions including biasing means for causing the gripping portions to grip the cylindrical end portion of the first coupling component to retain the gasket and the retaining means in position thereon, said retainer means being entirely open and unobstructed about the circumference of the gasket for slightly less than 180° of the gasket, the said gripping portions having concave gripping surfaces sized to the outer surface of the cylindrical end portion of the first coupling component to produce engagement over an arcuate portion of the cylindrical end portion of the first coupling component, and each of the concave gripping surfaces being joined to the gasket by a separate connecting portion.

4. The improvement as defined in claim 3 wherein the retainer means is formed integrally with the gasket.

5. The improvement as defined in claim 3 wherein the concave gripping surfaces are each joined to the gasket by a single connecting portion and the gasket has a circular outer periphery.

6. The improvement as defined in claim 1 wherein the retainer means is formed integrally with the gasket.

* * * * *